US007933259B2

(12) United States Patent
Culver

(10) Patent No.: US 7,933,259 B2
(45) Date of Patent: *Apr. 26, 2011

(54) INTERNET TELEPHONY SYSTEM WITH AUTOMATED CALL ANSWERING

(75) Inventor: Timothy Culver, Mesquite, TX (US)

(73) Assignee: MCI Communications Corporation, Ashburn, VA (US)

( * ) Notice: Subject to any disclaimer, the term of this patent is extended or adjusted under 35 U.S.C. 154(b) by 1434 days.

This patent is subject to a terminal disclaimer.

(21) Appl. No.: 10/767,500

(22) Filed: Jan. 29, 2004

(65) Prior Publication Data

US 2004/0184413 A1    Sep. 23, 2004

Related U.S. Application Data

(63) Continuation of application No. 09/007,714, filed on Jan. 15, 1998, now Pat. No. 6,690,663.

(51) Int. Cl.
*H04L 12/56* (2006.01)
(52) U.S. Cl. ...................................................... 370/352
(58) Field of Classification Search .................. 370/352, 370/356
See application file for complete search history.

(56) References Cited

U.S. PATENT DOCUMENTS

| 5,497,373 A | 3/1996 | Hulen et al. |
| 5,675,507 A | 10/1997 | Bobo, II |
| 5,724,412 A | 3/1998 | Srinivasan |
| 5,768,513 A | 6/1998 | Kuthyar et al. |
| 5,805,587 A | 9/1998 | Norris et al. |

FOREIGN PATENT DOCUMENTS

EP        794650        9/1997

OTHER PUBLICATIONS

"Four 11 Successful Search", http://www.four11.com, Jun. 11, 1998.
"Four 11 Directory Services", http://www.four11.com, Jun. 11, 1998.
"Four 11 Corporation", http://www.four11.com, Apr. 24, 1998.
Rinde et al., "Telephony Over the Internet—How to Make This Into a Public Service".

*Primary Examiner* — Melvin Marcelo

(57) ABSTRACT

A system and method for automatically answering a call from a calling party to a called party that originates via the Internet, includes and involves a data storage system and processor that is coupled to the data storage system. The processor is operative to initiate an automated call answering service in response to an Internet telephony call from the calling party which is intended to be received by the called party, to receive a message from the calling party via the Internet in accordance with the automated call answering service, and to store the message in the data storage system for processing by the processor in accordance with the automated call answering service.

29 Claims, 5 Drawing Sheets

INTERNET TELEPHONY SYSTEM WITH AUTOMATED CALL ANSWERING

RELATED APPLICATIONS

The present application is a continuation of U.S. patent application Ser. No. 09/007,714 filed on Jan. 15, 1998 now U.S. Pat. No. 6,690,663, entitled "Internet Telephony System With Automated Call Answering".

BACKGROUND OF THE INVENTION

1. Field of the Invention

The present invention relates systems and methods used to provide Internet telephony services.

2. Description of the Related Art

Telephone answering devices and a variety of voice mail messaging systems are well known. Such devices and systems allow callers to leave messages for intended called parties when the called parties are not available, able, or desirous to receive calls. Each such device and system allows a party to later access the same to receive or re-route previously recorded messages from calling parties. In fact, such automated call answering devices and systems have become so commonplace, that many people now consider them to be staple technologies of everyday life. For example, it is quite common for a person to have more than one automated call answering system to receive a variety of incoming calls. A home telephone answering machine, a voice mailbox associated with a work telephone number, and a voice mailbox associated with a cellular or other telephone number are typical messaging systems used within modern society. Additionally, while automated call answering devices and systems are widely deployed by telephone service subscribers, calling parties also have come to expect that the people they call will maintain some sort of automated call answering or messaging device or system so that the calling party can leave important information without having to speak to a live operator who may erroneously record a particular message.

With the recent acceptance and widespread use of the Internet, many companies have begun to operate Internet-based telephony systems and services. As such systems and services are very new, they are not yet as rich in features as conventional telephony systems. In particular, although Internet telephony systems allow calling parties to access a telephony site via the world wide web (WWW), request completion of an Internet call to another Internet user, and carry on an Internet-based voice communication session when the other Internet user is online, such systems do not offer features and services such as automated call answering and messaging.

In the case of the typical Internet telephony service, a calling party (i.e., a Internet user) accesses an Internet telephony web site, registers with that site, and peruses an online directory of potential called parties (i.e., other Internet users) that happen to be currently registered and connected to the web site. The calling party can only make calls (communicated via the Internet) to called parties that are actually online and ready, willing, an able to receive calls. There is no way for the calling party to leave a voicemail or other type of message (video message, etc.) for a particular called party if that called party happens to not be connected to the internet telephony web site. As such, calling parties are forced to play a hit or miss game in terms of actually contacting intended called parties online via an Internet telephony service.

Accordingly, there exists a need to provide systems and methods that will allow Internet calling parties to leave recorded messages (e.g., voicemail type messages, video-phone messages, etc.) for particular intended called parties who may not be available, able, or desirous to receive calls online. To be viable, such systems and methods must seamlessly work with existing Internet telephony systems to allow Internet calling parties to leave voicemail and, possibly, other types of messages for intended called parties who may later receive the same via the Internet or otherwise (e.g., via a conventional telephony link). Moreover, such systems and methods must allow calling and called parties to realize levels of functionality that they have heretofore come to expect from automated call answering and messaging systems.

SUMMARY OF THE INVENTION

In view of the foregoing comments related to the related art, it is the principal object of the present invention to solve the aforementioned by providing a system and corresponding processes that allow automated call answering and messaging services to be provided to Internet telephony users in response to Internet telephony calls.

It is another object of the present invention to provide a system and corresponding processes that will allow voicemail services to be provided in the context of internet telephony calls.

It is still another object of the present invention to provide a system and corresponding processes which will allow multi-media messages including voice data, video data and other data to be recorded during the context of an Internet telephony call and which may be retrieved via the Internet or otherwise (e.g., via a conventional telephony link, etc.).

It is yet another object of the present invention to provide a system and corresponding processes that will allow pager notification calls to be initiated which are intended to be received by paging devices controlled by called parties and which may notify such called parties that messages have been recorded in accordance with an automated Internet-based call answering or messaging service.

By achieving the aforementioned objects, the present invention provides certain benefits. For example, Internet telephony service providers will be able to offer enriched Internet telephony services which include voicemail and other automated call answering services which conventional telephony users have come to expect and enjoy. Internet users and, in particular, Internet telephony users will be able to receive the benefit of automated call answering and messaging services such as voicemail services when Internet telephony calls are not accepted or completed for any reason. In essence, the present invention combines the benefits of conventional automated call answering services with the benefits associated with Internet-based communications.

The present invention achieves the aforementioned objects to deliver the above-stated and other benefits by providing a system for automatically answering a call from a calling party to a called party that originates via the Internet. The system includes a data storage system and a processor that is coupled to the data storage system. The processor is operative to receive, during the call, a message from the calling party via the Internet, and to store the message in the data storage system for retrieval by the called party via the Internet.

According to another aspect of the present invention, a system for automatically answering a call from a calling party to a called party that originates via the Internet is provided. The system includes a data storage system and a processor. The processor is operative to initiate an automated call answering service in response to an Internet telephony call from the calling party which is intended to be received by the called party to receive a message from the calling party via the Internet during the call answering service, and to store the message in the data storage system for processing by the processor in accordance with the automated call answering service.

According to another aspect of the present invention, a method for automatically answering a call from a calling party to a called party that originates via the Internet is provided. The method includes the steps of receiving a message from the calling party via the Internet, storing the message for retrieval by the called party, and delivering the message to the called party via the Internet.

According to a final aspect of the present invention, a method for automatically answering a call from a calling party that is intended to be received by a called party that originates via the Internet is provided. The method includes the steps of initiating an automated call answering service in response to an Internet telephony call from the calling party, receiving a message from the calling party via the Internet in accordance with the automated call answering service, and storing the message in accordance with the automated call answering service.

BRIEF DESCRIPTION OF THE DRAWINGS

The present invention is described in detail below with reference to the following drawing figures, of which.

DETAILED DESCRIPTION OF THE PREFERRED EMBODIMENTS

Figure 1:
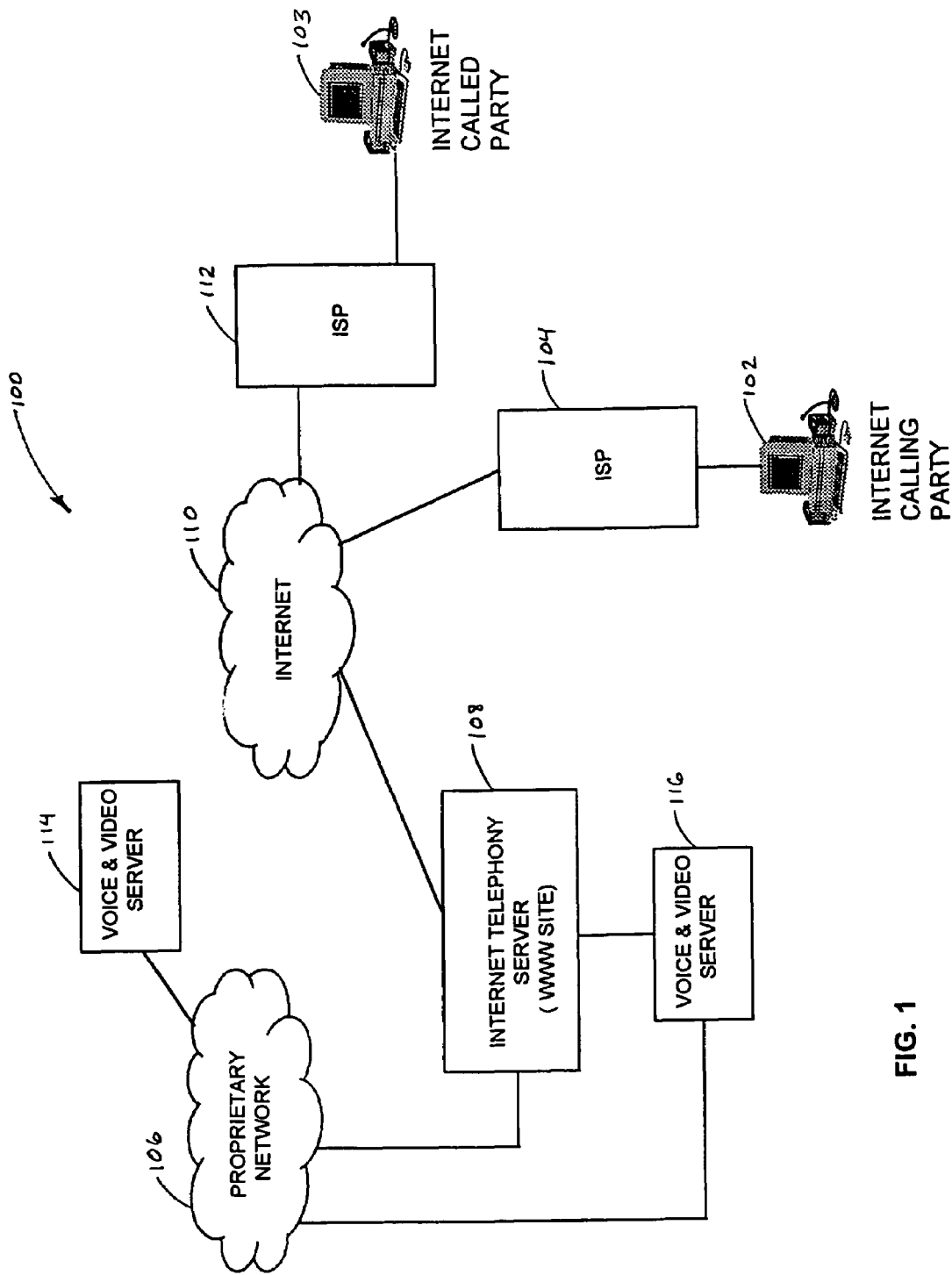
FIG. 1 is a diagram of a system in which automated call answering and messaging services are provided to Internet telephony users according to a preferred embodiment of the present invention.

The present invention is now described in detail with regard to the drawing figures that were briefly described above. A SYSTEM DESCRIPTION section in which the structures comprising the present invention are illustrated and explained, is followed by a corresponding SYSTEM OPERATION section in which the operations of the aforementioned structures are described. Unless otherwise indicated, like parts and processes are referred to with like reference numerals.

System Description

Figure 2:
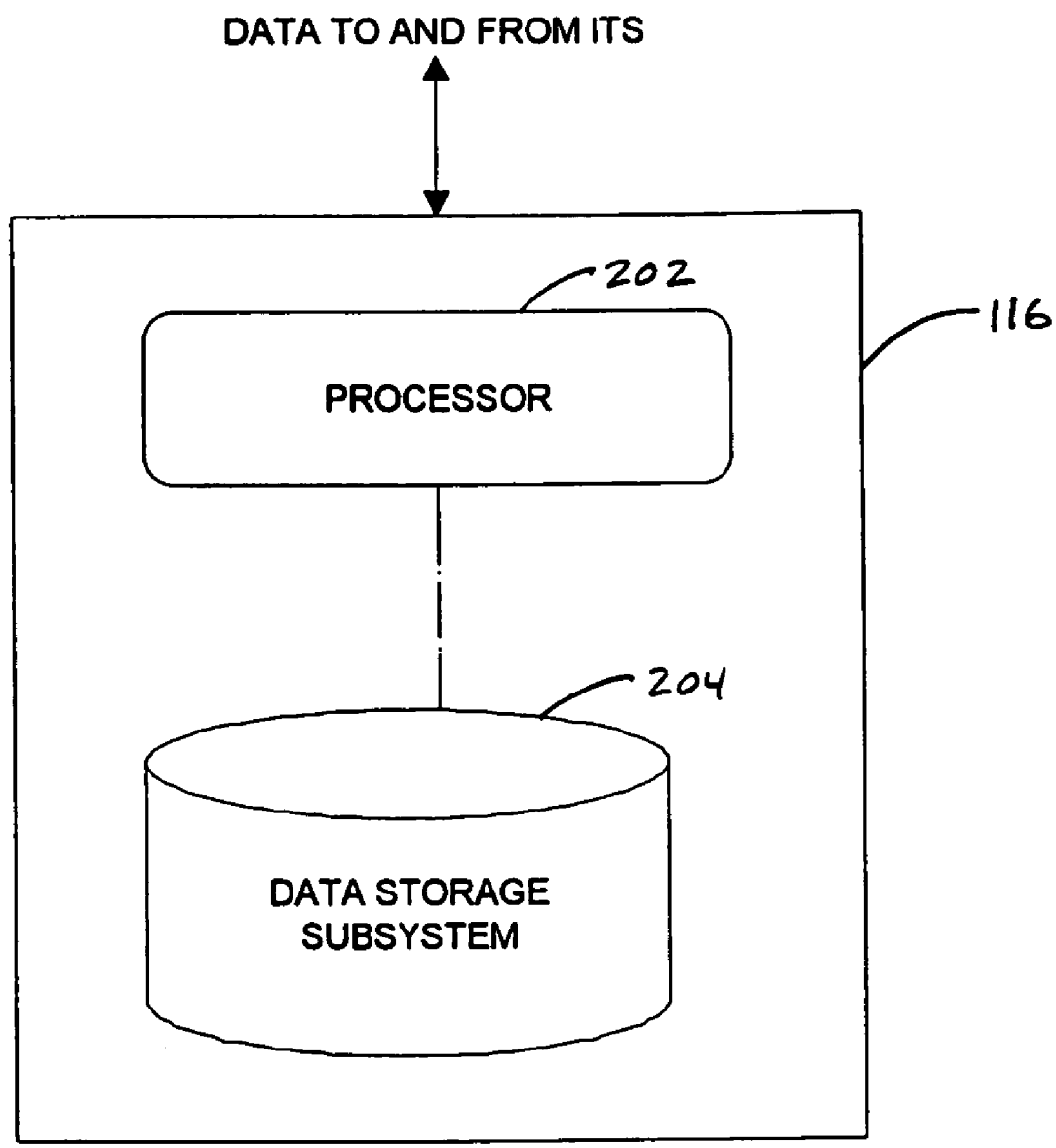
FIG. 2 is a block diagram of an automatic data processing system that is configured as a voice and video server as depicted in FIG. 1.
Figure 3:
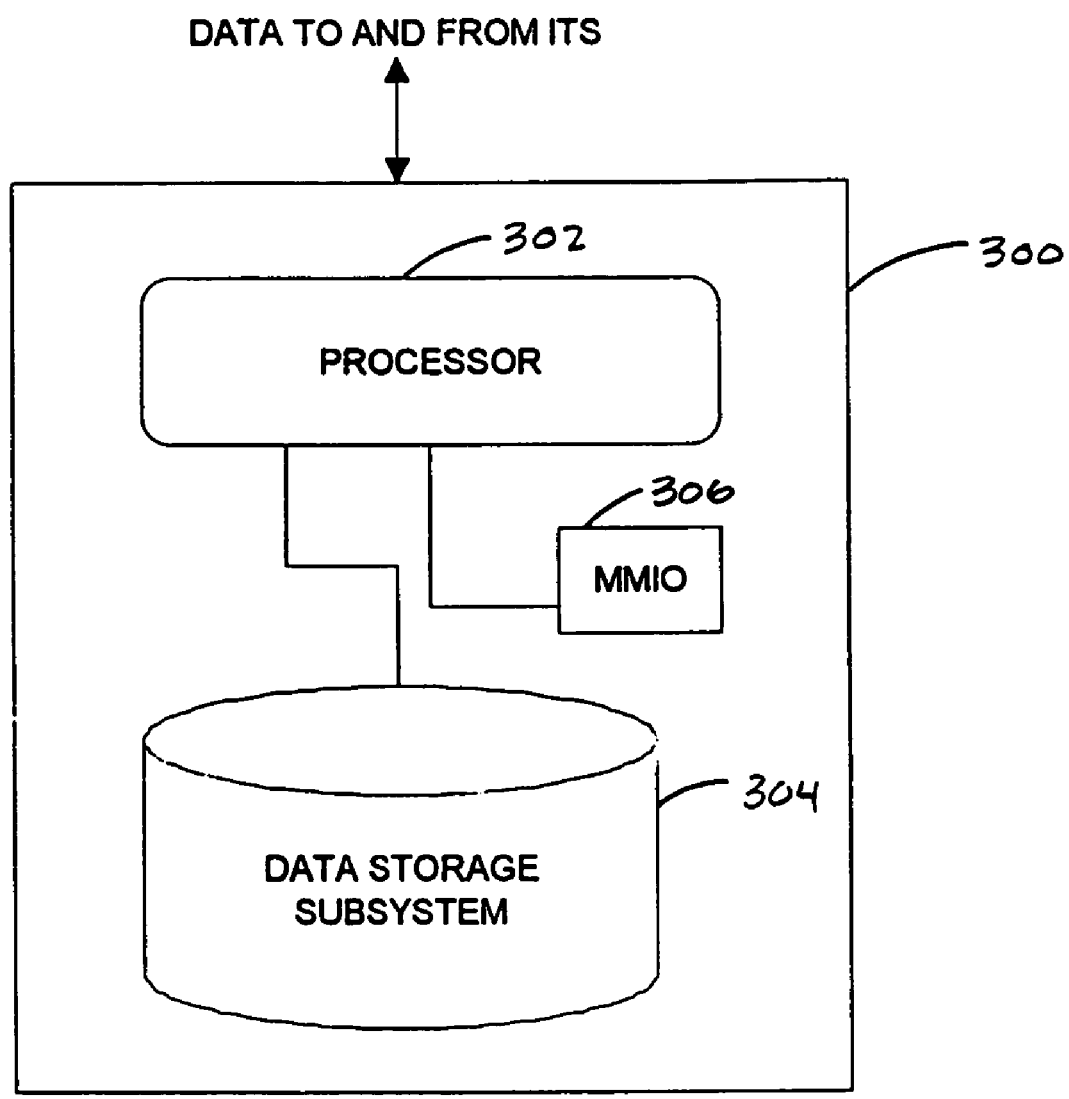
FIG. 3 is a block diagram of an automatic data processing system that is operated by the calling party depicted in FIG. 1.

The structures comprising the present invention are now described with regard to FIGS. 1-3.

Referring now to FIG. 1, depicted therein is a diagram of a system in which automated call answering and messaging services are provided to Internet telephony users according to a preferred embodiment of the present invention. In particular, system 100 is arranged to illustrate an exemplary arrangement of components and subsystems. Accordingly, system 100 includes an Internet calling party (ICP) 102 (who operates a personal automatic multi-media data processing like the one shown in FIG. 3 and discussed below), an Internet Called Party 103 (like ICP 102), an Internet Service Provider (ISP) 104, a proprietary network 106 which may be operated by a telecommunications company, an Internet Telephony Server (ITS) 108, the Internet 110, an ISP 112, a voice and video server 114, and a voice and video server 116.

ITS 108 includes one or more processor(s) (not shown) and a data storage subsystem or memory device (not shown). ITS 108 is configured as a server computer or automatic data processing system like or similar to a SPARC 1000 computing system which is manufactured and marketed by SUN MICROSYSTEMS, INC. Moreover, ITS 108 is configured to execute and run appropriate WWW server and database management software that will enable the provisioning of directory assistance information in response to corresponding requests for the same from users which are received via a network such as via the Internet and WWW and the provisioning of Internet or packet-based network telephony services to such users. Preferably, ITS 108 is configured to execute and run appropriate WWW server and database management software to provide directory assistance and Internet telephony functionality similar or like that found at the Four11™ WWW site (http://www.four11.com). Additionally, ITS 108 is configured to pass and receive digital data streams to and from voice and video server 116, respectively. Such digital streams can include voice, video, data, and other multi-media message data.

The structure of voice and video server 114 and of voice and video server 116 are further illustrated in FIG. 2. Although, only two voice and video servers are illustrated in system 100, the present invention is not so limited. To the contrary, any number of voice and video servers may be deployed depending on marketing needs, system needs, and a host of other factors that will be readily understood by those skilled in the art.

In system 100, the aforementioned component parts and subsystems thereof are coupled to each other as shown in conventional manners which will be readily understood and appreciated by those skilled in the art. For example, a dial-up connection between a system operated by ICP 102 and his ISP 104 will be readily understood by those skilled in the art. Also, the coupling of ITS 108 to the Internet 110 will be readily understood to be a high-speed telecommunications protocol link. Additionally, those skilled in the art will immediately recognize that the component parts and subsystems comprising system 100 may be located in a multitude of geographic locations and that there is no absolute requirement that any particular component or subsystem be located in any particular geographic location.

It should be noted that although ICP 102 and Internet Called Party 103 are shown as being coupled to the Internet via a dial-up connection to an Internet service provider, there is no such requirement. In fact, ICP 102 and Internet Called Party 103 could be configured to access Internet 110 and ITS 108 from any type of network connection that provides access to the Internet. Moreover, although ITS 108 is shown as being coupled to and accessible from the Internet 110, such an arrangement is merely exemplary and is not meant to limit the scope of the present invention. To the contrary, the present invention certainly contemplates an arrangement wherein ITS 108 may be integrated into an intranet or other network system/environment such as one wherein a private company maintains an network that supports internal network telephony (like Internet telephony, but within a private or limited access network). In such a case, ICP 102 and Internet Called Party 103 would likely be users within a firewall protected environment (e.g., within a company network environment) or those users that could possibly gain access to a private Intranet telephony server by first accessing an Internet site and then gaining access to a protected network environment operated by the company with which they are associated. It should be understood that users within a firewall would be able to go directly to an Intranet server without first having to access the Internet.

Referring now to FIG. 2, depicted therein is a block diagram of an automatic data processing system that is configured as voice and video server 116 (and 114) as depicted in FIG. 1. In particular, voice and video server 116 is an automatic processing system that includes one or more processors 202 and a data storage subsystem or memory 204. Like ITS 108, as described above, voice and video server 116 is configured as a server computer or automatic data processing system like or similar to a SPARC computing system (e.g., SPARC 20 or SPARC 1000) which is manufactured and marketed by SUN MICROSYSTEMS, INC. Additionally, voice and video server 116 is configured with input and output facilities to allow it to bi-directionally communicate (e.g., via a network connection, etc.) with ITS 108. Accordingly, messages such as voice, video and other multi-media messages that are received from a calling party via the Internet (e.g., from ICP 102) by ITS 108 can be sent to and processed by processor 202 and, ultimately, stored by processor 202 in data storage subsystem 204 for retrieval by Internet users such as Internet Called Party 103 via the Internet or otherwise (e.g., system 100 and voice & video server 114 could be configured to allow a conventional telephony dial-in connection to proprietary network 106 to access stored messages on voice and video server 114 and to retrieve the same via a conventional voice line and, possibly, via the publicly switched telephone network or via some other telephony network).

Referring now to FIG. 3, depicted therein is a block diagram of an automatic data processing system that may be operated either by ICP 102 or Internet Called Party 103 as depicted in FIG. 1. In particular, automatic data processing system 300 includes a processor 302 that is coupled to a data storage subsystem or memory device 304, and to a set of multi-media input/output devices 306 (e.g., a microphone, a compact disc drive, a set of speakers, a color printer, a scanner, etc.). Automatic data processing system 300 is a personal computing device like or similar in function to an IBM compatible computing system that is equipped with a PENTIUM® II microprocessor and related components and which is configured to execute and run a web browser client software package like or similar in function to the NETSCAPE® COMMUNICATOR™ browser suite which is manufactured and marketed by NETSCAPE COMMUNICATIONS CORP. Additionally, automatic data processing system 300 is configured to operate in accordance with Internet telephony client software (possibly a browser plug-in or other similar or functionally equivalent piece of computer software) to enable Internet telephony in accordance with, among others, the H.323 Internet Communications Standard. Suitable software would be the RealAudio audio player in combination a suitable web browser client (e.g., INTERNET EXPLORER 3.0+). Additionally, such software would include internet telephony capability like that available from INTEL CORPORATION ("http://www.intel.com"). Subscription to a free service like Four11 via the web is preferred.

In addition to the structure shown in FIG. 3, automatic data processing system 128 is equipped with communications components such as a modem, a network interface card, or other network interface device that enables automatic data processing system 300 to communicate with ITS 108 (FIG. 1) via the Internet 110 and WWW (e.g., via ISP 104). The structure and implementation of such devices will be readily understood by those skilled in the art.

System Operation

Figure 4:
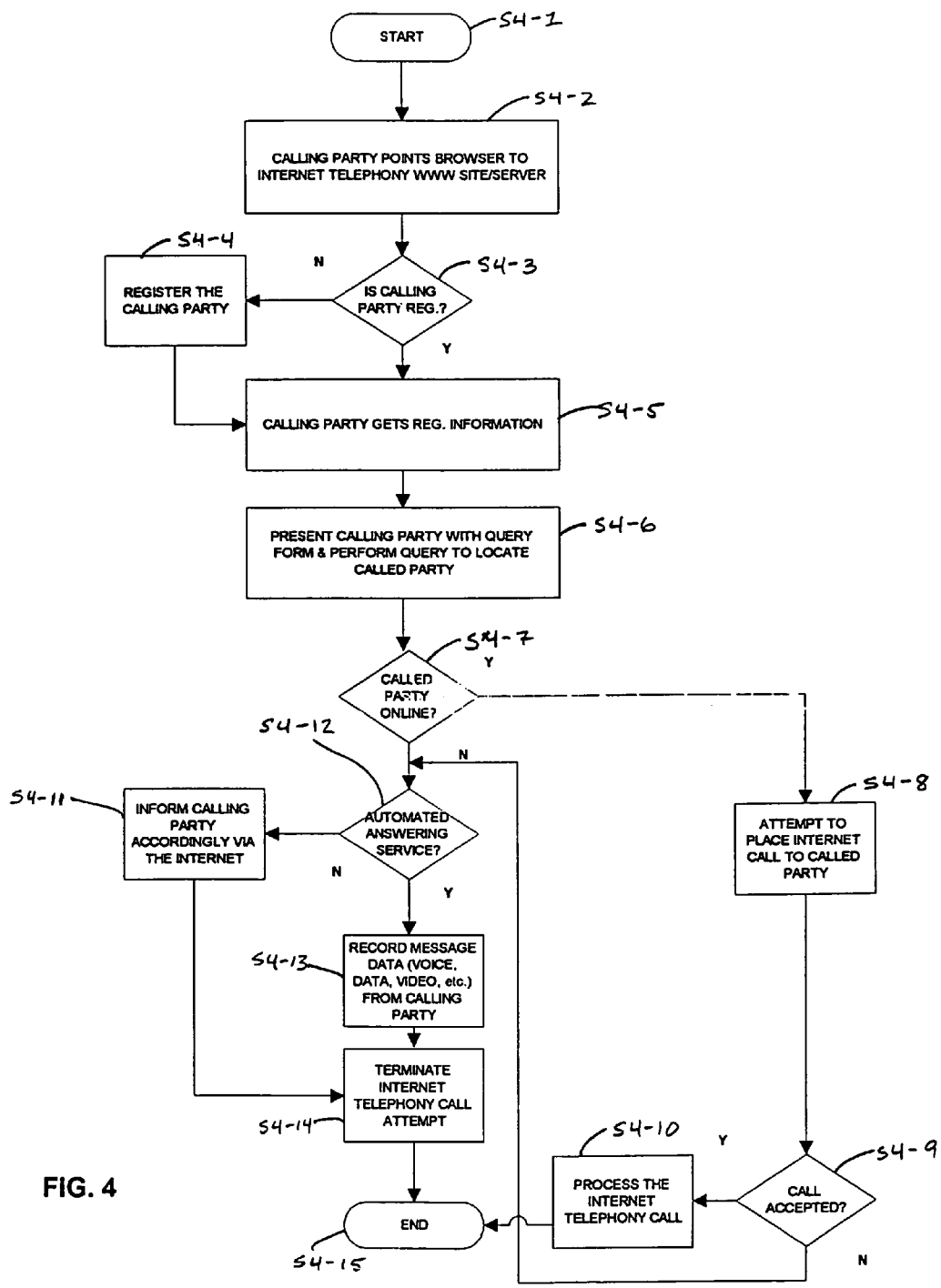
FIG. 4 is a flow-chart that illustrates the operations carried out within the system depicted in FIG. 1 to provide automated call answering and messaging services to Internet telephony users.
Figure 5:
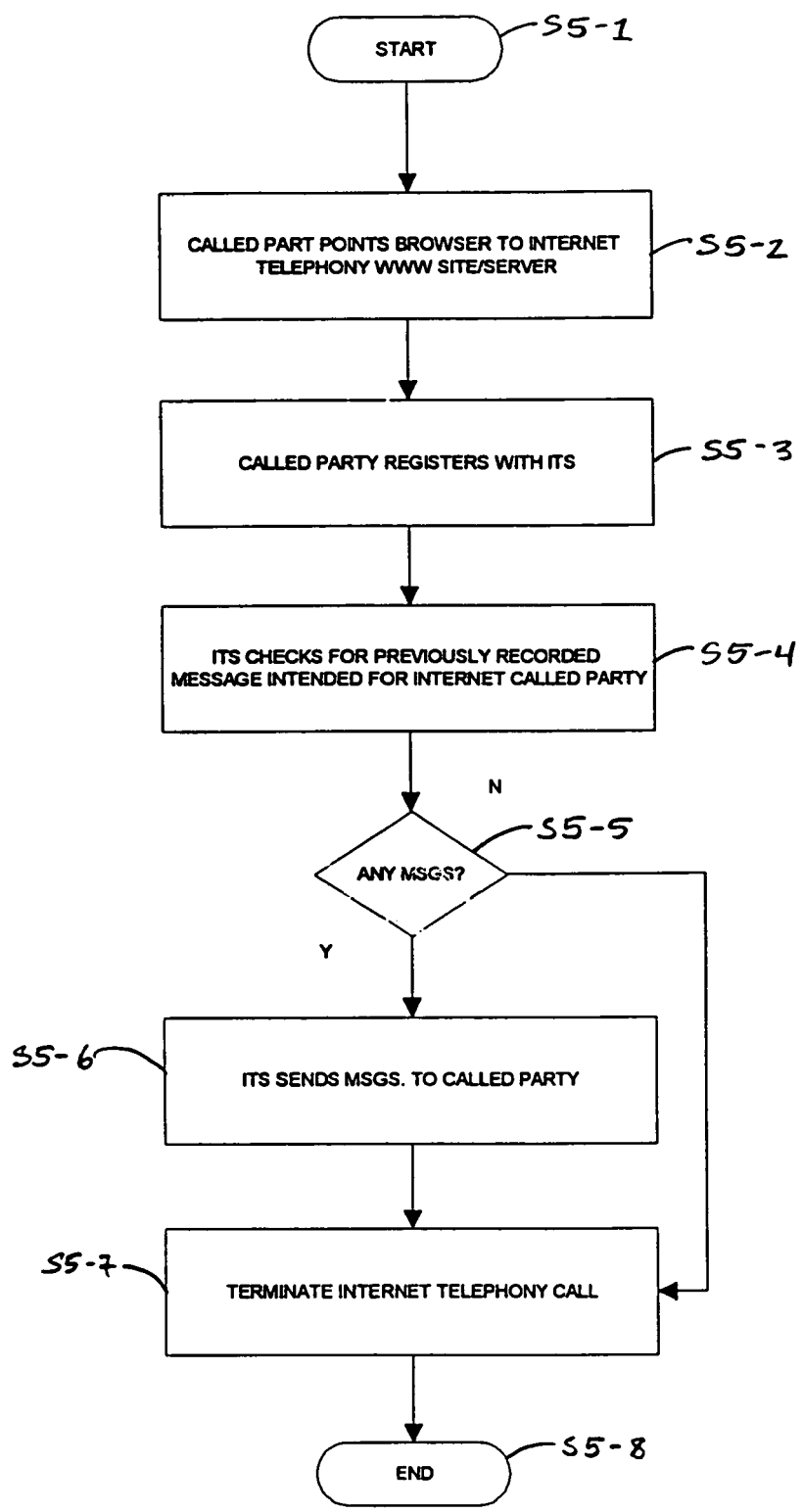
FIG. 5 is a flowchart that illustrates the operations carried out within the system depicted in FIG. 1 to deliver pre-recorded messages via the Internet to a subscriber of an automated call answering service according to a preferred embodiment of the present invention.

The structures described above in regard to FIGS. 1-3 are configured to operate together to provide automated call answering and messaging services to Internet users. The requisite and salient operations to bring about such functionality and services are illustrated in FIGS. 4 and 5. More particularly, the operations depicted in FIGS. 4 and 5 are, in many respects, intended to be carried out via computer software. Such computer software and, in particular, the programming constructs necessary to bring about such operations will be readily apparent to those skilled in the art after reviewing and understanding the detailed operations illustrated in FIGS. 4 and 5.

Accordingly, in regard to FIG. 4, depicted therein is a flow-chart that illustrates the operations carried out within the system depicted in FIG. 1 to provide automated call answering and messaging services to Internet telephony users. In particular, processing starts at Step S4-1 and immediately proceeds to Step S4-2. At Step S4-2, ICP 102 points his browser software to an Internet telephony web site associated with ITS 108. Such action will be immediately understood by those skilled in the art.

Next, at Step S4-3, a determination will be made at ITS 108 as to whether ICP 102 is registered to engage in Internet telephony (i.e., is he a registered user of an Internet telephony service associated with ITS 108?). If not, processing proceeds to Step S4-4 where ICP 102 will be given the opportunity to become a registered user of the Internet telephony services offered by and associated with ITS 108. Such action likely will include the use of web-based HTML forms implemented with appropriate CGI scripts to retrieve input from ICP 102 via the Internet.

If, at Step S4-3, the determination was affirmative, processing proceeds to Step S4-5, where ICP 102 may receive a confirmation of his registration or access to a web site associated with ITS 108. For example, a welcome screen (e.g., an appropriate HTML document) may be configured to welcome ICP 102 to the web site associated with ITS 108.

In any case, processing proceeds to Step S4-6, where ITS 108 will present ICP 102 with a query form (e.g., a CGI script enabled HTML form) to request ICP 102 to enter information related to a particular, intended called party (e.g., name, network screen name, etc.) so that ICP can place an Internet telephony call. Upon receiving ICP 102's entries via the Internet, ITS 108 will perform an appropriate database query to locate the particular, intended called party (e.g., a structured query language query within a relational database management system based on the form data entries of ICP 102).

Next, at Step S4-7, ITS 108 will determine if the particular, intended called party (Internet Called Party 103, for purposes of discussion) is currently online by determining if Internet Called Party 103 is currently engaged in an Internet telephony session with ITS 108. Such processing will be readily understood by those skilled in the art and may include a database search and the like related to active online callers. The negative path from Step S4-7 is discussed below after a discussion of the processing at Step S4-9. If Internet Called Party 103 is online, proceeds to Step S4-8 where ITS 108 will attempt to place and allow an Internet telephony call session to be initiated and processed between ICP 102 and Internet Called Party 103 in a conventional Internet telephony way.

Next, at Step S4-9, a determination will be made as to whether Internet Called Party 103 accepted the call from ICP 102. If Internet Called Party 103 did accept the Internet telephony call from ICP 102, processing proceeds to Step S4-10 where the call will be processed, until termination, in a conventional Internet telephony way. Ultimately, after call termination, the Internet telephony session is terminated and processing ends at Step S4-15. Of course, processing could be directed to Step S4-6 to allow ICP 102 to engage in another Internet telephony session at a web site associated with ITS 108. Such loop-back type processing will be readily understood by those skilled in the art.

If, at Step S4-9, the determination was negative, processing proceeds to Step S4-7 which was discussed above. The aforementioned comments concerned the positive path leading from Step S4-7. The negative path is now described. In particular, processing proceeds to Step S4-12 where a determination will be made as to whether an automated call answering and/or messaging service is associated with Internet Called Party 103. If not, processing proceeds to Step S4-11 where ICP 102 will be informed that Internet Called Party 103 does not have an automated call answering and/or messaging service (e.g., Internet-based voicemail, Internet call-forwarding, Internet call-pager notification, or any other type of automated call answering service). Thereafter, processing proceeds to Step S4-14 where ITS 108 will terminate the Internet telephony call session attempt. And, ultimately processing ends at Step S4-15.

If at Step S4-12, the determination was affirmative, processing proceeds to Step S4-13, where a message from ICP 102 intended for Internet Called Party 103 will be recorded by a voice and video server associated with ITS 108 (e.g., voice and video server 116). Such a message may take the form of a digital stream containing any sequence of digital data. According to the present invention, such digital data may be representative of multi-media information such as voice data, video data, sound data, intended printer data, fax data, or any other content that can be digitally recorded. As such, the present invention provides a complete system and corresponding method for providing an Internet telephony voice mail system. The recording of voicemail data in a digital format will be readily understood by those skilled in the art.

Next, processing proceeds to Step S4-14 which was discussed in detail above

Processing ends at Step S4-15.

In regard to FIG. 5, depicted therein is a flow-chart that illustrates the operations carried out within the system depicted in FIG. 1 to deliver pre-recorded messages via the Internet to a subscriber of an automated call answering service according to a preferred embodiment of the present invention. In particular, processing starts at Step S5-1 and immediately proceeds to Step S5-2

At Step S5-2, a subscriber such as Internet Called Party 103 points his browser software to an Internet telephony web site associated with ITS 108.

Next, at Step S5-3, Internet Called Party 103 registers with ITS 103 (e.g., logs on and receives an Internet cookie from ITS 108). Cookies will be readily understood by those skilled in the art to allow the creation of virtual sessions in a stateless environment like the Internet.

Thereafter, at Step S5-4, ITS 108 checks for previously recorded messages for Internet Called Party. And, at Step S5-5, a corresponding determination will be made. If the determination is affirmative, processing proceeds to Step S5-6 where ITS 108 will send any previously recorded messages to Internet Called Party 103 via the Internet for manifestation by a multi-media automatic data processing system maintained by Internet Called Party 103 (e.g., a system like the one illustrated in FIG. 3 as discussed above). Accordingly, if a previously recorded message stored by ITS 108 and voice and video server 116 is a voicemail message, the same can be sent to Internet Called Party 103 for manifestation by his system's sound device and speakers. If a message contains video clips, the same can be manifested by a video controller and video display combination maintained by internet Called party 103.

It should be understood that pre-recorded messages may be sent to Internet Called Party in real-time (e.g., as streams of data that are manifested by appropriate multi-media components as they are being received) or in file form (e.g., as ".wav" files containing sound bites that will be manifested in accordance with appropriate player software, etc.). If files are to be delivered to Internet Called Party 103, the same may be sent as electronic mail or attachments to electronic mail. In any case, the present invention is not to be limited by any particular method or format of message delivery.

After all messages are delivered to Internet Called Party 103, processing proceeds to Step S5-7, where the Internet telephony message reception session will be terminated by ITS 108. Ultimately, processing ends at Step S5-8.

If the determination made at Step S5-5, was negative, processing proceeds to Step S5-7 as discussed above.

Processing ends at Step S5-8.

In the process depicted in FIG. 5, reception of previously recorded messages via the Internet was illustrated. It should be understood that the present invention could be configured to allow a called party to access his Internet-based recorded messages via another telephony network (e.g., via a dial-in connection to voice and video server 116 via the publicly switched telephone network or via some other network such as a telephony system maintained within a private organization). Accordingly, there is no absolute requirement that messages recorded via the Internet must be provided or delivered to called parties via the Internet. Such dial-in operations are based on the structure shown in FIG. 1 and, in particular, the fact that a proprietary network may be accessed ultimately to access a voice and video server such as voice and video server 116 or 114.

It should also be noted that the present invention contemplates pager notification relative to recorded messages. For example, after a message is recorded via the Internet, a pager notification may be sent to internet Called Party 103's pager device or other type of wireless receiver (which he controls) notifying him that messages have been recorded via that Internet. The nature and type of the message may be communicated to Internet Called Party 103's pager. For example, depending on Internet Called Party 103's pager capabilities (numeric, display, etc.), a numeric message may be sent indicating the presence of Internet voicemail, or a text message containing a notice that pre-recorded Internet voicemail has been stored at a particular web site location (e.g., at a particular web site uniform resource locator (URL)). The initiation of pager notification calls and, especially, pager notification calls that may be initiated, placed, and completed by telephony networks (e.g., intelligent services networks) coupled to Internet telephony systems will be readily understood by those skilled in the art.

Thus, having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in the appended claims.

What is claimed is:

1. A method of providing telephony services over an Internet Protocol (IP) network, comprising:
   providing a web site for enabling a calling party to initiate a voice call to a called party over the IP network;
   receiving a request from the web site by the calling party to initiate a voice call to the called party over the IP network;
   determining whether the voice call initiated by the calling party is accepted by the called party;
   if the voice call initiated by the calling party is not accepted by the called party, then performing the steps of:
      receiving a message from the calling party via the web site; and
      transmitting the message to a data storage system for storing the message for retrieval by the called party.

2. The method according to claim 1, wherein the message includes a voicemail message.

3. The method according to claim 1, wherein the message includes a video message.

4. The method according to claim 1, wherein the message contains multi-media information.

5. The method according to claim 1, further comprising:
   initiating a pager notification call to a pager device operated by the called party, said pager notification call for notifying the called party that the message has been stored and is available for delivery via the IP network.

6. The method according to claim 5, wherein said pager notification call includes an indication of a web site uniform resource locator (URL) for retrieving the message.

7. The method according to claim 1, wherein said determining whether the voice call initiated by the calling party is accepted by the called party includes:
   determining whether the called party is online; and
   if the called party is online, determining whether the called party accepts the voice call initiated by the calling party.

8. A telephony system for providing telephony services over an Internet Protocol (IP) network, comprising:
   a server for providing a web site for enabling a calling party to initiate a voice call to a called party over the IP network and receiving a request from the web site by the calling party to initiate a voice call to the called party over the IP network; and
   a processor configured for receiving a message from the calling party via the web site if the voice call initiated by the calling party is not accepted by the called party and transmitting the message to a data storage system for storing the message for retrieval by the called party.

9. The system according to claim 8, wherein the message includes a voicemail message.

10. The system according to claim 8, wherein the message includes a video message.

11. The system according to claim 8, wherein the message contains multi-media information.

12. The system according to claim 8, further comprising:
   means for initiating a pager notification call to a pager device operated by the called party, said pager notification call for notifying the called party that the message has been stored and is available for delivery via the IP network.

13. The method according to claim 12, wherein said pager notification call includes an indication of a web site uniform resource locator (URL) for retrieving the message.

14. The system according to claim 8, wherein the processor is further configured for determining whether the called party is online and, if the called party is online, determining whether the called party accepts the voice call initiated by the calling party.

15. A method of providing telephony services over an Internet Protocol (IP) network, comprising:
   providing a web site for enabling telephony services over the IP network to at least a calling party and a called party;
   receiving a request from the web site by the calling party to initiate a voice call to the called party over the IP network;
   determining whether the voice call initiated by the calling party is accepted by the called party;
   if the voice call initiated by the calling party is not accepted by the called party, then performing the steps of:
      receiving a message from the calling party via the web site; and
      transmitting the message to a data storage system for storing the message for retrieval by the called party;
   receiving a request from the web site by the called party to retrieve a message from the calling party;
   fetching the message from a data storage system storing the message for retrieval by the called party; and
   transmitting the message to the called party over the Internet Protocol network.

16. The method according to claim 15, wherein the message includes a voicemail message.

17. The method according to claim 15, wherein the message includes a video message.

18. The method according to claim 15, wherein the message contains multi-media information.

19. The method according to claim 15, further comprising:
   initiating a pager notification call to a pager device operated by the called party, said pager notification call for notifying the called party that the message has been stored and is available for delivery via the IP network.

20. The method according to claim 19, wherein said pager notification call includes an indication of a web site uniform resource locator (URL) for retrieving the message.

21. The method according to claim 15, wherein said determining whether the voice call initiated by the calling party is accepted by the called party includes:
   determining whether the called party is online; and
   if the called party is online, determining whether the called party accepts the voice call initiated by the calling party.

22. The method according to claim 15, further comprising:
   registering the called party via the web site.

23. A telephony system for providing telephony services over an Internet Protocol (IP) network, comprising:
   a server for:
      providing a web site for enabling telephony services over the IP network to at least a calling party and a called party,
      receiving a request from the web site by the calling party to initiate a voice call to the called party over the IP network, and
      receiving a request from the web site by the called party to retrieve a message from the calling party; and
   a processor configured for:
      receiving a message from the calling party via the web site if the voice call initiated by the calling party is not accepted by the called party,
      transmitting the message to a data storage system for storing the message for retrieval by the called party,
      fetching the message from a data storage system storing the message for retrieval by the called party, and transmitting the message to the called party over the Internet Protocol network.

24. The system according to claim 23, wherein the message includes a voicemail message.

25. The system according to claim 23, wherein the message includes a video message.

26. The system according to claim 23, wherein the message contains multi-media information.

27. The system according to claim 23, further comprising:

means for initiating a pager notification call to a pager device operated by the called party, said pager notification call for notifying the called party that the message has been stored and is available for delivery via the IP network.

28. The method according to claim 27, wherein said pager notification call includes an indication of a web site uniform resource locator (URL) for retrieving the message.

29. The system according to claim 23, wherein the processor is further configured for determining whether the called party is online and, if the called party is online, determining whether the called party accepts the voice call initiated by the calling party.

* * * * *